US008375392B2

(12) United States Patent  
Becchi et al.

(10) Patent No.: US 8,375,392 B2  
(45) Date of Patent: Feb. 12, 2013

(54) DATA AWARE SCHEDULING ON HETEROGENEOUS PLATFORMS

(75) Inventors: Michela Becchi, Columbia, MO (US); Surendra Byna, Princeton, NJ (US); Srihari Cadambi, Princeton, NJ (US); Srimat Chakradhar, Manalapan, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 371 days.

(21) Appl. No.: 12/860,694

(22) Filed: Aug. 20, 2010

(65) Prior Publication Data

US 2011/0173155 A1    Jul. 14, 2011

Related U.S. Application Data

(60) Provisional application No. 61/294,160, filed on Jan. 12, 2010, provisional application No. 61/299,415, filed on Jan. 29, 2010.

(51) Int. Cl.  
*G06F 9/46* (2006.01)

(52) U.S. Cl. .................. 718/102; 719/318; 719/319

(58) Field of Classification Search .................. None  
See application file for complete search history.

(56) References Cited

PUBLICATIONS

Gregory Diamos et al. (Harmony Runtime Techniques for Dynamic Concurrency Inference, Resource Constrained Hierarchical Scheduling, and Online Optimization in Heterogeneous Multiprocessor Systems, Jun. 2008).*

Chi-Keung Luk et al. (Qilin: Exploiting Parallelism on Heterogeneous Multiprocessors with Adaptive Mapping, 2009).*

Diamos, G. et al., "Harmony: An Execution Model and Runtime for Heterogeneous Many Core Systems", HPDC Jun. 23-27, 2008, 4 pages.

Luk, C.K. et al., "Qilin: Exploiting Parallelism on Heterogeneous Multiprocessors with Adaptive Mapping", in Proc. of MICRO 2009, pp. 1-10.

* cited by examiner

*Primary Examiner* — Emerson Puente  
*Assistant Examiner* — Sisley Kim  
(74) *Attorney, Agent, or Firm* — James Bitetto; Joseph Kolodka

(57) ABSTRACT

Systems and method for data-aware scheduling of applications on a heterogeneous platform having at least one central processing unit (CPU) and at least one accelerator. Such systems and methods include a function call handling module configured to intercept, analyze, and schedule library calls on a processing element. The function call handling module further includes a function call interception module configured to intercept function calls to predefined libraries, a function call analysis module configured to analyze argument size and location, and a function call redirection module configured to schedule library calls and data transfers. The systems and methods also use a memory unification module, configured to keep data coherent between memories associated with the at least one CPU and the at least one accelerator based on the output of the function call redirection module.

12 Claims, 6 Drawing Sheets

DATA AWARE SCHEDULING ON HETEROGENEOUS PLATFORMS

RELATED APPLICATION INFORMATION

This application claims priority to provisional application Ser. No. 61/294,160 filed on Jan. 12, 2010, incorporated herein by reference and also to provisional application Ser. No. 61/299,415 filed on Jan. 29, 2010, incorporated herein by reference.

BACKGROUND

1. Technical Field

The present invention relates to heterogeneous architectures and, more particularly, to systems and methods for data-aware scheduling of legacy kernels in heterogeneous platforms.

2. Description of the Related Art

Heterogeneous platforms are those with both a multi-core central processing unit (CPU) and a many-core accelerated processor such as a graphics processing unit (GPU). To realize the higher performance that such platforms can deliver, however, programmers need intimate knowledge of the GPU architecture. In order to help the common programmer develop code for such platforms, GPU implementations of several "kernels" are made available as libraries. Thus each library kernel has both a CPU and GPU implementation.

Even if such libraries are available, however, a runtime that can decide how to schedule the kernel (on the CPU or GPU) is important for optimal performance. A kernel may be faster on the CPU or GPU depending on the size of its parameters and location of its arguments. This is especially true in heterogeneous platforms that have distributed memory, where the CPU and GPU sub-systems are connected by a non-coherent interconnect and there is no shared memory.

SUMMARY

A system for data-aware scheduling of applications on a heterogeneous platform having at least one central processing unit (CPU) and at least one accelerator, includes a function call handling module configured to intercept, analyze, and schedule library calls on a processing element and a memory unification module, configured to keep data coherent between memories associated with the at least one CPU and the at least one accelerator based on the output of the function call redirection module. The function call handling module further includes a function call interception module configured to intercept function calls to predefined libraries, a function call analysis module configured to analyze argument size and location, and a function call redirection module configured to schedule library calls and data transfers.

A method for data-aware scheduling of applications on a heterogeneous platform having at least one central processing unit (CPU) and at least one accelerator includes determining a size and a location of requested data, and using the determined size and location of requested data to schedule processing and data transfers. Scheduling processing and data transfers includes comparing a time needed to transfer data having the determined size to a threshold. If the time needed to transfer data having the determined size is greater than the threshold, processing a kernel at a first processing element at the location of the requested data. If the time needed to transfer data is below the threshold, transferring the requested data to a second location and processing the kernel at a second processing element at the second location.

A method for data-aware scheduling of applications on a heterogeneous platform having at least one CPU and at least one accelerator includes receiving a function call, determining a function call type of the function call with a processor, and triggering a page fault based on the function call type and a synchronization status to trigger data synchronization using a page fault exception handler in an operating system.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
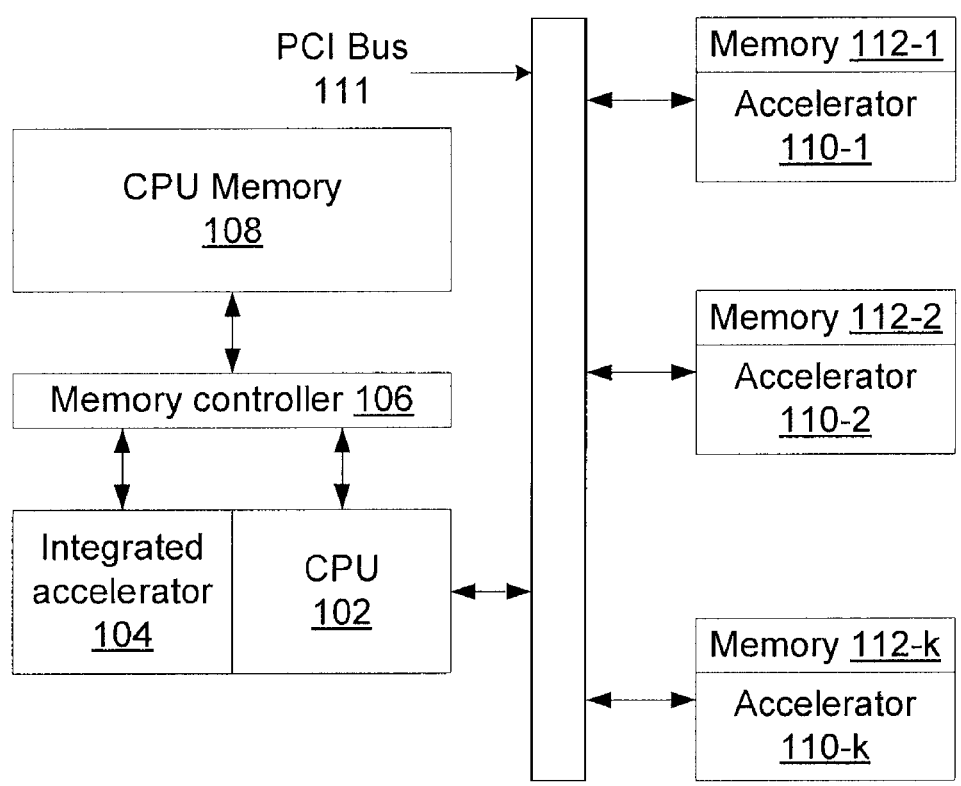
FIG. 1 shows a diagram of a heterogeneous platform that illustrates both a disparate arrangement as well as an integrated arrangement.

Heterogeneous platforms that include central processing units (CPUs) as well as accelerators such as graphics processing units (GPUs) are becoming increasingly widespread, especially for applications that include data parallel components such as scientific, media-rich and graphically intense portions. The CPU is the "master," offloading computations to different accelerators. Heterogeneous platforms may incorporate discrete memory systems, wherein the memory systems for the CPU and the accelerators are kept separate, while integrated platforms have accelerators that share physical memory with the CPU. A runtime may be designed according to the present principles that schedules computation-intensive kernels found in legacy code on suitable computing resources in the heterogeneous platform, while reducing the overall data transfer time and maintaining data coherence.

To reduce data movement, the runtime defers data transfers between different memory systems and attempts to move computations to the data, rather than the reverse. While this could lead to multiple inconsistent copies of data, the present principles further provide an operating system module that maintains coherence by intercepting calls to shared data and forcing synchronization. This system provides a unified computation and memory view to the programmer and hides the underlying heterogeneity.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an exemplary heterogeneous platform 100 is shown. A multi-core CPU 102 is connected to integrated accelerator 104 via a memory controller 106. Both the CPU 102 and the integrated accelerator 104 have access to CPU memory 108 through the memory controller 106. In addition, a set of discrete accelerators 110-*l* through 110-*k* are connected to the CPU 102 through a PCI bus 111. Although a PCI bus is used here for the purposes of illustration, it is contemplated that any form of communication between the CPU 102 and the discrete accelerators 110 may be implemented. Each of the discrete accelerators 110-*l* through 110-*k* have access to a respective device memory 112-*l* through 112-*k*.

Ideally, a heterogeneous system should enable any legacy code written for homogeneous systems to run faster, transparently to the programmer. Library-based programming, where pre-compiled assembly-level libraries for common kernels on the accelerators are made available, eases the burden of parallelizing applications on heterogeneous systems such as that shown in FIG. 1. A candidate kernel has at least two library implementations, one for the CPU and one or more for the accelerators. For example, dense matrix multiplication has sgemm and cublasSgemm which are optimized implementations for x86 CPUs and nVidia GPUs respectively. Legacy applications written using these library APIs can be transparently accelerated by intercepting the library calls, and invoking a suitable accelerator implementation. A runtime according to the present principles is cognizant of data transfer overheads and dynamically schedules operations taking into account not only the predicted processing performance, but also data transfer.

If an application has three candidate kernels with both CPU and GPU implementations and, during a certain execution path, the first kernel is estimated to be much faster, but the second and third much slower on the GPU (based on the sizes of their parameters), a data-agnostic scheduler is likely to run the first kernel on the GPU, and the rest on the CPU. However if the runtime discovers that the first kernel produces a large amount of data that is consumed by the second kernel, a better schedule may be to run the second kernel also on the GPU. Although the GPU is slower in processing the second kernel compared to the CPU, this schedule will obviate the large intermediate data transfer, and potentially result in an overall speedup. A runtime according to the present principles analyzes such situations using history-based models to predict processing as well as data transfer time and uses these to guide the scheduling policy. The runtime intercepts calls to candidate kernels, examines their arguments, and uses historical information and prior decisions to devise a schedule on-the-fly. Once a decision is reached for a kernel, it invokes its CPU or GPU implementation in a process that is completely transparent to the user.

The runtime has mechanisms to ensure coherent access to multiple copies of the same data residing in different memories (e.g., CPU and GPU memory). In particular, the memory access handler provides synchronization routines. The corresponding synchronization points can either be manually defined by source code annotation, or dynamically handled by the operating system (with no code changes) in keeping with the spirit of accelerating legacy code, as will be discussed in more detail below.

A goal of the runtime is to dynamically schedule computational kernels onto heterogeneous computing resources, namely the CPU and GPU, so as to maximize the throughput of the overall application. To this end, the runtime aims at minimizing the kernel execution time as well as the overhead due to data transfers between the CPU and GPU. In effect, the runtime hides the heterogeneity in terms of computational elements and memory modules.

A runtime operates at the granularity of a function call. An application runs by default on the CPU and may perform calls to well known kernels for which multiple implementations— either targeting CPU or GPU—are provided. When one of these computational kernels is invoked, the runtime determines the implementation to instantiate. This decision depends on two factors: the kernel execution time and the data transfer time. In turn, these factors depend on the size of the function call parameters and on the location of the corresponding data. GPU kernel implementations assume that their parameters reside on the GPU memory. It is therefore the responsibility of the runtime to hide this fact from the calling application and to maintain a mapping between data structures residing on CPU and on GPU memories. Data is not transferred to the CPU memory at the end of each GPU kernel invocation, but only when that data is used.

Each computational kernel, whether it targets the CPU or GPU, is essentially a "black box" to the runtime: the only visible data transfers which can be optimized are the ones concerning the function call parameters, and not those occurring within the kernel itself.

Figure 2:
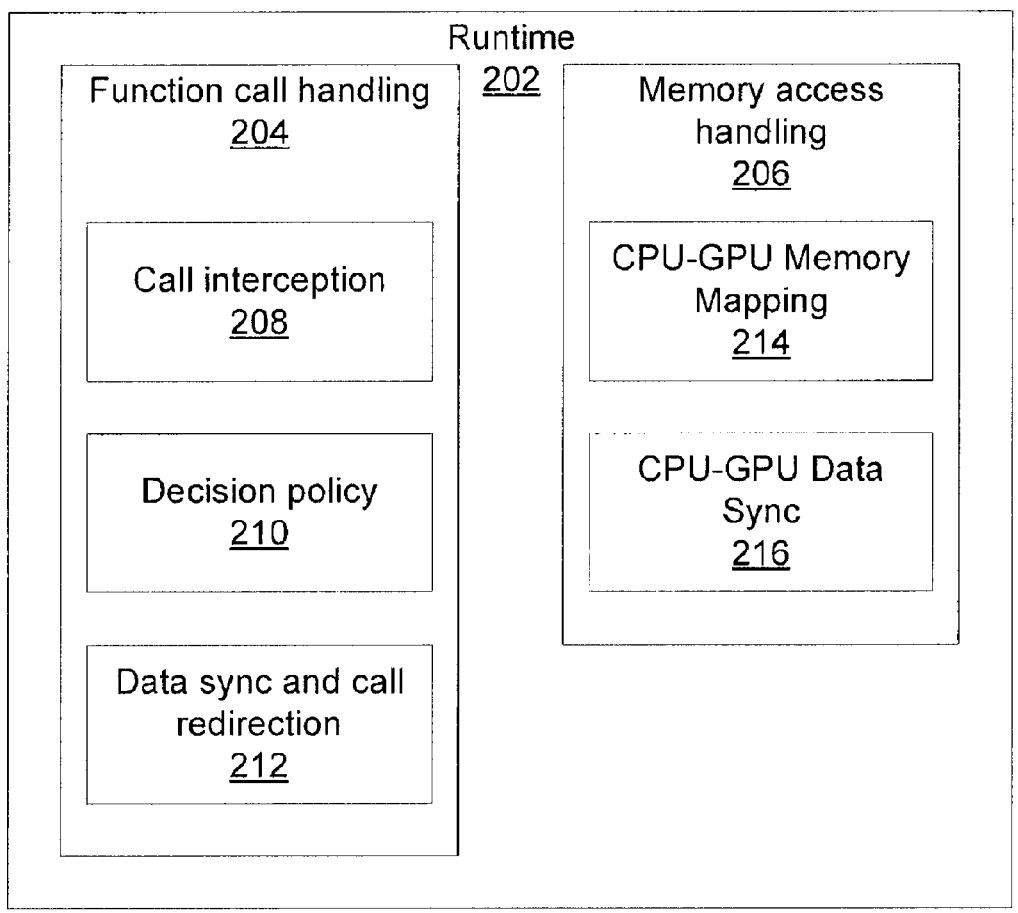
FIG. 2 shows a diagram of a data-aware runtime that intercepts function calls and defers data transfers.

Referring now to FIG. 2, a proposed runtime is shown. The runtime 202 includes two modules: function call 204 and memory access handlers 206. The function call handler 204 intercepts kernel calls 208, determines which kernel implementations to instantiate 210, and invokes them 212. The memory access handler 206 maintains a mapping between CPU and GPU data structures 214, and handles data transfers and synchronizations 216. The services offered by the memory access handler are available to the function call handler through an API.

The function call handler 204 intercepts predefined kernel calls and invokes the proper library implementations depending on the call parameters and on the data location. For each kernel function having input parameters in_pars and output parameters out_pars, the module 204 includes a function whose structure is exemplified in the pseudo-code below (void return code is used only for illustration purposes).

```
(1)   void fn(in_pars, *out_pars){
(2)     /* determine the best target for fn */
(3)     if(eval_loc(&fn,in_pars,out_par)==CPU){
(4)       for (p in in_pars) mam->sync(p);
(5)       /* schedule on CPU */
(6)       cpu_fn(in_pars,out_pars);
(7)       for (p in out_pars) mam->set_cpu(p);
(8)     }else{
(9)       in_pars_d = out_pars_d = Ø;
(10)      for (p in in_pars) in_pars_d U= mam->get(p,true);
(11)      for (p in out_pars) out_pars_d U= mam->get(p,false);
(12)      /* schedule on GPU */
(13)      gpu_fn(in_pars_d, &out_pars_d);
(14)      for (p in out_pars) mam->set(p);
(15)    }
(16)  }
```

The mam object (at lines 4, 7, 10, 11 and 14) represents the interface offered by the memory access module, that will be described in more detail below. The cpu_fn and gpu_fn routines (at line 6 and 13, respectively) represent the CPU and GPU implementation of the considered kernel. For example, under GNU/Linux based operating systems, the function call handler can be dynamically linked to the application through the LD_PRELOAD directive. Pointers to cpu_fn and gpu_fn are obtained using the combination of dlopen/dlsym directives (the pointer to cpu_fn can also be obtained simply using dlsym and setting the handle to RTLD_NEXT).

The eval_loc routine (line 3) is also defined within the function call handler 204, and determines the best target for the intercepted function call at 208. This decision is made by estimating the data transfer time of the input parameters and the kernel execution time on both CPU and GPU. The runtime transfers data only when such data do not reside on the memory module where they are needed for execution. eval_loc queries the memory access module 206 for the location of each input parameter, and estimates the data transfer time based on the parameter size. In case of GPU execution, eval_loc considers the size and the location of the output parameters to determine whether the GPU has enough free memory to allocate them. In order to estimate the kernel execution time on both CPU and GPU, eval_loc uses profiling information. In particular, for all considered kernels, CPU and GPU execution time for different input parameters is measured in order to obtain the input size/execution time characteristic. At runtime, the eval_loc routine uses the actual input parameters to locate the operation point.

If the eval_loc routine establishes that the execution must happen on the CPU (lines 3-7), then the cpu_fn kernel is invoked. Before its invocation, all input parameters are synchronized (line 4). mam->sync will have no effect if the CPU has an up-to-date copy of the data. After kernel execution, the output parameters are marked as residing on the CPU (line 7). This operation does not imply any data transfer.

If the kernel execution takes place on the GPU (lines 8-15), then gpu_fn is invoked (line 13). However, this kernel implementation operates on GPU memory. Therefore, a local copy of all input and output parameters (in_pars_d and out_pars_d) is created (lines 9-11). For each parameter, the mem→get function returns the pointer to that copy (and, if necessary, allocates the corresponding memory on GPU). The last parameter of the mem→get call specifies whether the GPU must have an up-to-date copy of the data, which is necessary only for the input parameters. After kernel execution, the output parameters are marked as residing on the GPU (line 14). Again, this operation does not imply any data transfer.

The memory access handling module 206 orchestrates data transfers and synchronizations between CPU and GPU memory. In order to do so, the memory access handling module 206 maintains a mapping between CPU and GPU memory regions. In particular, GPU global memory is seen as a set of non-overlapping data blocks, each of them corresponding to a CPU data block. The mapping is stored in the data block list, a linked list of data_block_t structures, as represented below.

```
typedef enum {SYNCED,ON_CPU,ON_GPU} sync_t;
typedef struct {
  void *cpu_addr;
  void *gpu_addr;
  size_t size;
  sync_t sync;
  time_t timestamp;
} data_block_t;
```

Each data block has a CPU address cpu_addr, a GPU address gpu_addr, a size expressed in bytes, a synchronization status (sync) and a timestamp indicating the last access to the block. The synchronization status indicates whether the content of CPU and GPU blocks is synchronized (SYNCED) or whether the up-to-date copy of the data resides in CPU/GPU memory (ON_CPU/ON_GPU). Since the application runs on the CPU and the runtime 202 operates at the granularity of the function call, the memory access module 206 allocates GPU memory (and updates the data block list) only when the runtime 202 invokes the GPU implementation of an intercepted function.

The memory access module 206 can be described through the primitives offered by its interface. The bulk of the CPU-GPU memory mapping's handling 206 is performed within the get primitive, which is invoked by the runtime 202 on all parameters of a GPU kernel call. Given a CPU memory block (denoted by its starting address cpu_addr and its size), the get routine returns the pointer to the corresponding GPU memory block, and throws an exception if such block does not exist and cannot be allocated or transferred. If the parameter update is set to true, then the content of the GPU memory block is up-to-date. This typically holds when get is invoked on an input parameter of a function call, but is not required when this routine is called on an output parameter. As an option, get may use the Nvidia's® CUDA cudaMalloc and cudaMemcopy primitives to perform memory allocations and data transfers.

Figure 3:
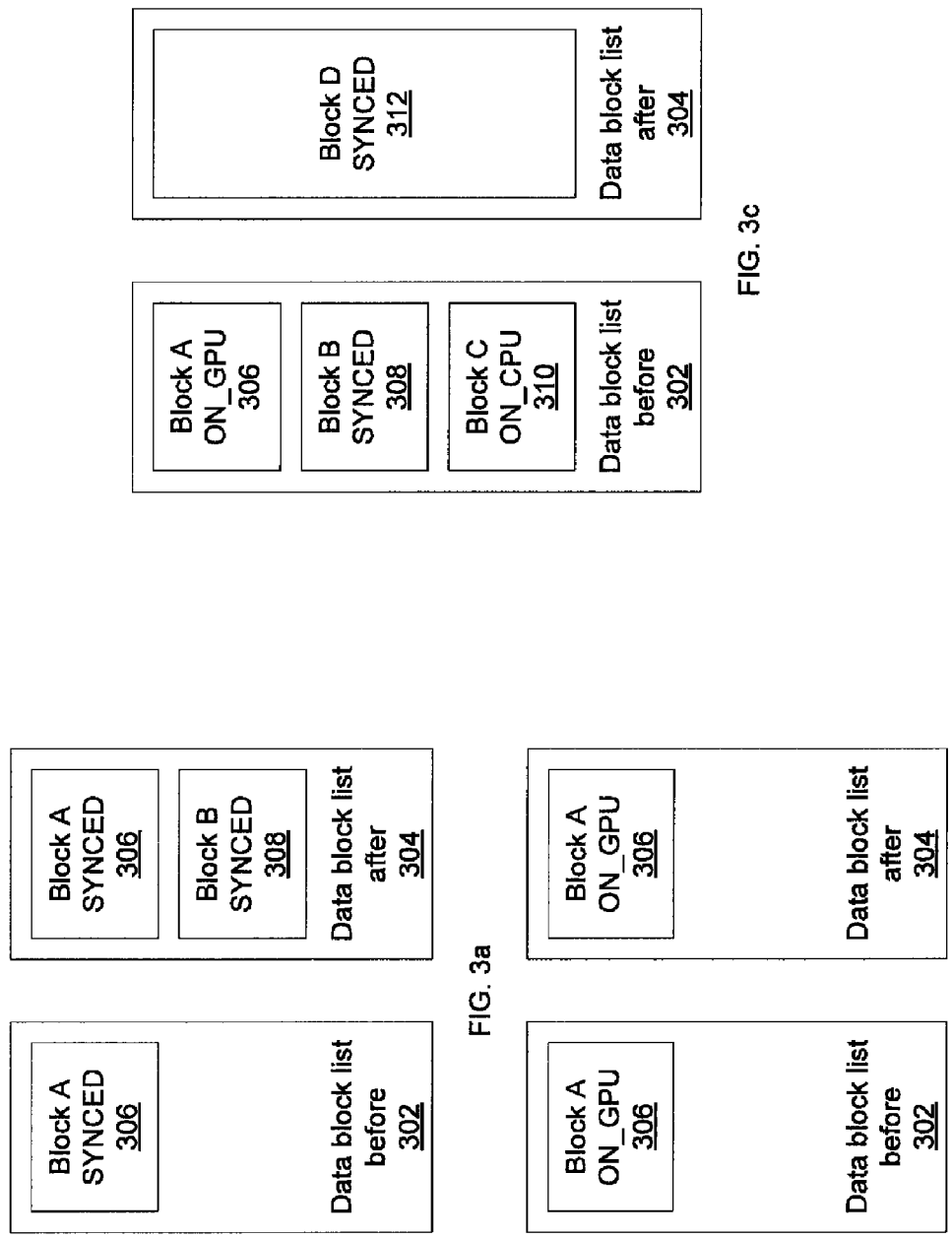
FIG. 3a shows a data block list before and after a get function is invoked when the requested data does not reside in a given memory.
FIG. 3b shows a data block list before and after a get function is invoked when the requested data is already in a given memory.
FIG. 3c shows a data block list before and after a get function is invoked when the requested data spans multiple blocks.

Referring now to FIGS. 3a, 3b, and 3c, three memory arrangements are shown that illustrate what may occur when get is invoked. FIG. 3a shows what happens when the block does not reside in GPU memory. FIG. 3b shows what happens when the block resides in GPU memory. FIG. 3c shows what happens when the requested data block spans multiple existing blocks. In each figure, the content of the data block list is shown before (left hand side) and after (right hand side) the invocation of get.

If the requested block does not reside in GPU memory, as shown in FIG. 3a, a GPU memory allocation is performed and a new entry is added to the data block list. FIG. 3a shows a block list 302 that includes a block A 306, but not the requested block B 308. The memory allocation is followed by a data transfer (from CPU to GPU) 216 only if the update parameter of the get call is set to true. The resulting data block list 304 then includes the synced block B 308.

Referring now to FIG. 3b, if the block B 308 resides in GPU memory, no memory allocation is performed and the content of the data block list is used to return the proper GPU address. A data transfer (from CPU to GPU) is performed at 216 only if the update parameter of the get call is set to true and the sync attribute of the block is set to ON_CPU. In fact, no data transfer is needed if the GPU has already an up-to-date copy of the data.

Referring now to FIG. 3c, if the requested data block spans over multiple existing blocks, and possible extends beyond them, a new data block D 312 is allocated which covers the requested block and all of the spanned blocks. Each spanned block 306, 308, and 310 can then be de-allocated and removed from the data block list 304. The data transfer of the new block D 312 from CPU to GPU is performed only if the update parameter of the get call is set to true. However, if some of the spanned blocks have the sync attribute set to ON_GPU, such as blocks 306 and 310 in FIG. 3c, the portion of the new block overlapping them 312 is restored from GPU memory before their de-allocation. The following sequence of operations is assumed: first, block A 306 is copied from GPU to CPU; second, all three blocks on the left hand side 306, 308, and 310 are de-allocated and removed from the data block list; finally, block D 312 is allocated and copied from CPU to GPU.

GPU kernel execution affects only the GPU memory. The runtime does not enforce any GPU to CPU memory transfer after the invocation of a GPU kernel. Instead, data consistency is ensured by invoking the set primitive on all output parameters of the GPU kernel call. Given a CPU address, this routine sets the sync attribute of the corresponding data block to ON_GPU. An exception is thrown if such block cannot be found in the data block list. Since each set operation is preceded by the corresponding get, this situation should never occur.

When a kernel is invoked on CPU, the runtime must ensure that the CPU memory has an up-to-date copy of all input parameters. To this end, it invokes the sync primitive. This function checks whether the data block list has one or more blocks containing addresses in the range [cpu_addr, cpu_addr+size] and having attribute sync equal to ON_GPU. In this case, the blocks are copied to the CPU and their attribute sync is set to SYNCED. Note that no action is required if the given address range is not mapped to GPU memory. An error during data transfer will cause an exception to be thrown.

After execution of a CPU kernel call, output parameters are marked as residing on the CPU memory. This is accomplished by calling the set_cpu function. This function will set the sync attribute of data blocks that have the given address range to ON_CPU. Again, no action is required if the data block list contains no such blocks.

The eval_loc primitive in the function call handling module obtains information about the location of the input parameters from the memory access module. This is achieved through the location function. The location function returns ON_GPU if the given address range belongs to a block in the data block list, and the attribute sync of the block is not equal to ON_CPU. In all other cases, ON_CPU is returned. Note that the goal of this function is to report whether invoking the get operation on the given address range would cause any GPU memory allocation and/or data transfer. This holds whenever location returns ON_CPU.

The memory access module also provides a free primitive. The free primitive eliminates from the data block list all entries containing addresses from the given address range, and frees the corresponding GPU memory. This function is invoked in two circumstances: when the application de-allocates data, and when GPU memory runs full. In the latter case, the runtime uses the timestamp field in the data_block_t structure to determine the least recently used blocks. "Dirty" blocks are copied back to CPU before GPU de-allocation.

When running legacy applications, accesses performed outside the intercepted function calls to address ranges mapped on GPU can originate data inconsistency problems. Source code inspection can determine all accesses to variables which can potentially be modified by the intercepted function calls. The application is then modified by adding a call to sync before every memory read, and to set_cpu after every memory write to these variables. This manual operation can be avoided by integrating the runtime with the operating system, as will be described below.

The present principles enable legacy applications to automatically run on heterogeneous platforms with minimal data transfers and with full data coherence. The operating system and runtime may be used to provide the programmer with a unified memory view of possibly discrete underlying memory sub-systems. Besides scheduling computations and managing data movement between the CPU and accelerators, the runtime ensures coherence of data present in multiple locations without source code or hardware changes. For example, consider a situation where legacy code is executing on a heterogeneous platform consisting of a CPU 102 and GPU 110 with separate memory sub-systems 112. Assume a kernel has executed on the GPU 110, and the runtime defers transferring back data in order to improve performance. Now there are two copies of the data, one of which is stale (stored in CPU memory 108), and the other current (stored in accelerator memories 112). If the CPU 102 needs to use the data, the runtime can transfer it back from the GPU 110 (on demand). But the runtime has to be made aware whenever the CPU 102 accesses stale data. In order to trap CPU accesses, the present principles provide operating system changes that assist the runtime in this process. Runtime and operating system changes are non-intrusive, because they require neither source code modifications to legacy applications, nor changes to the underlying hardware platform.

These runtime and operating system changes minimize data transfer and yet keep multiple copies of data coherent. The changes apply to "discrete" heterogeneous systems, where the CPU 102 and accelerators 110 have disjointed memory sub-systems 112. Another category is the "integrated" heterogeneous system where the CPU 102 and accelerator 104 share the same physical memory 108. An example of an integrated platform is the Ion® platform where an nVIDIA® GPU shares memory with an Intel® Atom® CPU. Data transfers between the CPU 102 and accelerators 104 in such systems can be completely avoided by using pinned host memory that is mapped to the device space. This means the CPU 102 and accelerator 104 will access the same shared memory 108 over the same memory bus 106. The proposed runtime determines when to reallocate CPU memory such that it is mapped to both the CPU and a device space. Upon such reallocation, the OS modification techniques discussed below can be used to redirect CPU accesses to the old memory into the reallocated, shared portion.

Figure 4:
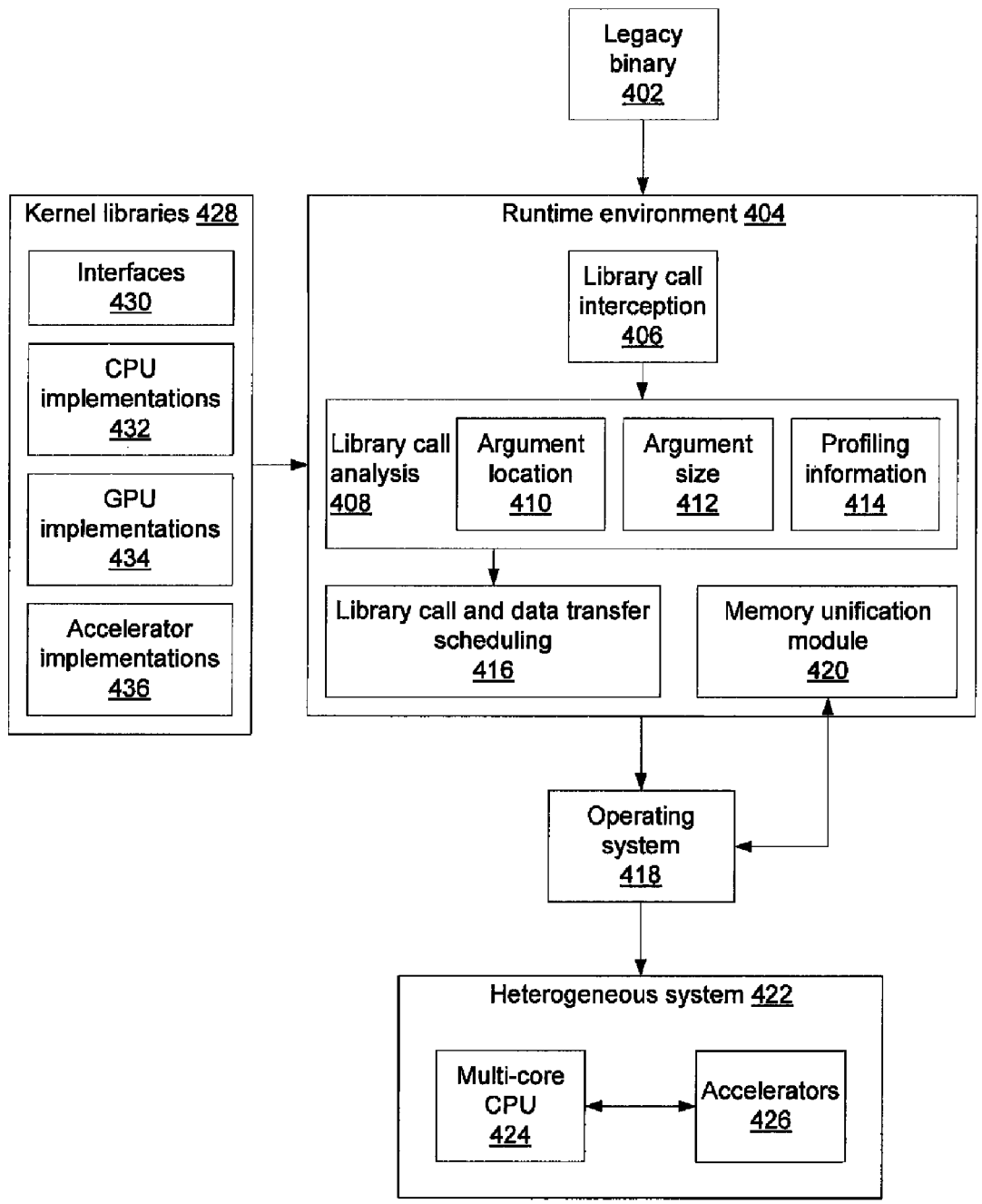
FIG. 4 shows a diagram of a data-aware system for running legacy applications on a heterogeneous platform.

Referring now to FIG. 4, the overall structure of an interface between a heterogeneous platform 422 and legacy binaries 402 is shown. The legacy binary 402 interacts with a runtime 404. Such a runtime may include a library call module that includes library call interception 406, library call analysis 408, and library call and data transfer scheduling 416. The library call analysis module 408 collects information about argument location 410, argument size 412, and profiling information 414. The runtime further includes a memory unification module 420 that is integrated with operating system 418 and assists the runtime in keeping memories coherent. The runtime 404 further receives information from kernel libraries 428. The kernel library implementations 432, 434, and 436 may be "black boxes" to the runtime, but the library API is exposed through interfaces 430. Thus the only data transfers that the runtime can optimize correspond to the API function arguments. Moreover, data transfers between CPU 424 and accelerator 426 memory can be triggered only by the runtime.

To that end, kernel library implementations, e.g. accelerator implementations 436, operate on the memory of the target device 426. The GPU implementation of sgemm, for example, will assume that the matrices pointed to by the function arguments reside on GPU memory. Second, for each pointer argument, the kernel library interface may be annotated with information pertaining to whether a parameter is read-write, read-only, or write-only from the functions perspective, as well as information regarding the size of the data structure which the argument points to. For each device type in use, the runtime may be provided with primitives to allocate device memory and transfer data between CPU 424 and device 426 memory. Moreover, in the case of integrated devices, the runtime may be provided with primitives to allocate page-locked host memory to those devices.

The runtime's library call module redirects library calls 416 to the most suitable unit after having triggered the related data transfers. Each library implementation may be profiled 414 on the available computational units for different input sizes. This profile information, along with the actual arguments 410 and 412, is used to estimate execution time. Data transfer time depends on the size and location of the function call parameters, both of which are known to the memory unification module 420.

An exemplary application for the present principles is supervised semantic indexing (SSI) classification. SSI is an algorithm used to semantically search large document databases. It ranks the documents based on their semantic similarity to text-based queries. Each document and query is represented by a vector, with each vector element corresponding to a word. Thus, each vector is sparse, and has as many elements as in the dictionary. Each vector element is the product of Term Frequency (TF) and Inverse Document Frequency (IDF) of the word that it corresponds to. TF is the number of times a word occurs in the document and IDF is the reciprocal of the number of documents that contain the word (thus IDF reduces the importance of commonly occurring words). Before classification can take place, the system is trained. During this training process, a weight matrix is generated; by multiplying a query or document vector with the weight matrix, one may obtain a smaller dense vector which contains relevant information for document-query matching. Each dense document and query vector is now C elements long, where C is the number of concepts. The matching process then multiplies the query vector with all document vectors and identifies documents whose vectors produced the top few (k) results.

The SSI matching process has two candidate kernels that are compute-intensive and good candidates for the many-core GPU 426. The first candidate, sgemm, is the multiplication of the query vectors with all document vectors, which is essentially a dense matrix-matrix multiplication. With D documents in the database and Q simultaneous queries, the document matrix size is D×C and the query matrix size is Q×C. The second kernel, topk_rank, selects, for each query vector, the top k best matching documents. In other words, topk_rank selects the top k elements from the products of query vectors with document vectors. With millions of documents to search for each query, these two kernels take up 99% of the SSI execution time.

By dynamically scheduling computational kernels onto heterogeneous computing resources, namely a CPU 424 and GPU 426, the throughput of the overall application can be greatly increased. To this end, a runtime 404 according to the present principles aims at minimizing kernel execution time as well as the overhead due to data transfers between the CPU 424 and GPU 426. In effect, the runtime 404 hides the heterogeneity in terms of computational elements and memory modules.

In order to run the legacy binaries for an SSI system such as that described above, function calls to well known kernel libraries containing multiple implementations are intercepted. The calls are then rerouted to the most suitable computational unit. Therefore the runtime 404 takes calls from the legacy binaries 402 and sends them to either the CPU 424 or the accelerator 426. However, in a traditional accelerator-based system, the input arguments of a function call are copied to device memory before kernel invocation, and the outputs are transferred back to host memory afterwards. This can trigger unnecessary data transfers, especially between multiple kernels that are invoked in sequence on the same device.

According to the present principles, data transfers between different memory elements should be triggered by the runtime only on demand. At any given time, a data structure may reside on multiple memory elements, but not all the copies may be up-to-date. In this situation, the runtime 404 ensures that every access is coherent through the use of memory unification module 420.

More issues arise when data can be replicated across more than one accelerator. A copy of the data will always reside on CPU memory, and may be outdated. Copying between two different accelerator memories involves an intermediate copy on the CPU memory. If an application includes a sequence of library calls, and one library call is scheduled on a device, it is likely that the next call will be scheduled on the same device. Allowing data to reside in parallel on multiple devices complicates coherency handling without substantially increasing performance. The present principles address this problem by limiting data replication to a single accelerator memory.

A further design issue rests in whether the system has "distributed" or "integrated" memory, as noted above with reference to FIG. 1. In the former case, the devices 110 have their own memory 112 and data is transferred between CPU 108 and device memory 112. In the latter case, shared address space on CPU memory 108 can be created by using page-locked memory that is mapped into the device space. Note that, if not enough page-locked memory is available, the CPU and the integrated device will access separate memory regions on the same physical memory, and the coherency problem is solved as in the distributed case.

In order to achieve data coherence, the memory unification module 420 maintains a mapping between CPU 424 and device 426 memory regions and provides an API to query the binding between different memory spaces, obtain the location of data structures, and perform device memory allocation, de-allocation, and data transfers. This API can be invoked by the library call module 416 when intercepting function calls.

However, if data are distributed across different memories and data transfers are deferred, synchronizing at the library call granularity is not sufficient to guarantee data coherence. In fact, all data accesses happening outside the intercepted function calls would not incur any synchronization, thus leading to possible inconsistencies and incorrect operation. To address this issue, the present principles integrate the memory unification module 420 with the operating system 418, as shown in FIG. 4. In this way, data synchronizations may be handled outside kernel calls by forcing page faults and having a page fault exception handler in the operating system 218 invoke the memory unification module 420. Thus, the memory unification module API can be invoked by two entities: the library call module in runtime 404 and the page fault exception handler in operating system 418.

One exemplary operating system in which the present principles might be embodied is the Linux operating system. This choice is intended only to be illustrative, and those having ordinary skill in the art will recognize that the present principles may be applied to other systems as well. Linux associates each running process with a list of memory regions each assigned a set of access rights with a set of linear (i.e. virtual) addresses. Similarly, the memory unification module associates each process with a list of non-overlapping data blocks, each one representing sets of linear addresses that have been mapped onto a device. Each data block may cover a subset of a memory region or may span across several memory regions.

Each data block consists of a linear start address, a byte size, a device address, a location (identifier of the device where the data have been allocated), the timestamp of the last access to the block on device, and a synchronization status, indicating whether the content of CPU and device memory is synchronized or whether the up-to-date copy of the data in the block resides in CPU or device memory. Additionally, in the case of integrated devices, an additional field indicates the address in page-locked memory where the data block has been mapped.

Figure 5:
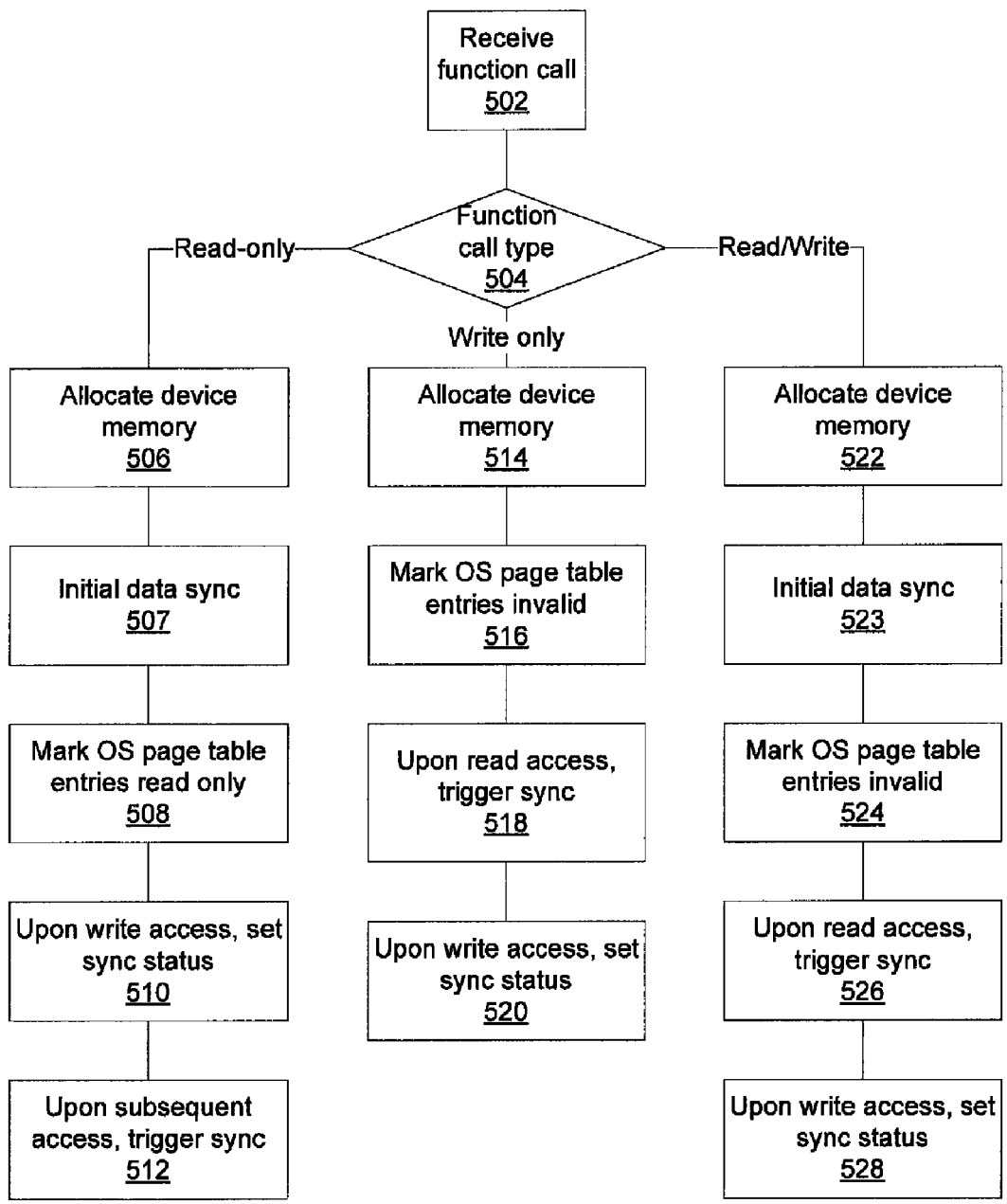
FIG. 5 shows a block/flow diagram of function call handling using page faults.

Referring now to FIG. 5, function call handling according using page faults is shown. Data block creations are invoked by the library call module at 502. In particular, a new data block is instantiated when a linear address range is accessed by a function call scheduled on a device. Different scenarios are taken into consideration here. The type of function call is determined at decision block 504.

If the function call is scheduled on a PCI-connected device 110, then the access rights of the function call arguments are important. If the argument is read-only, then device memory 112 is allocated at block 506 and data are initially synchronized by performing a host-to-device memory transfer at block 507. To handle coherence, all OS page table entries corresponding to the given address range are marked as read-only at 508. Any subsequent read access to the data block will be allowed, whereas any write access will trigger a segmentation fault. Note that a write access implies that the CPU 102 code is modifying a data structure which has been copied to a device 110. Therefore, in this situation the page fault handler will resolve the fault by setting the synchronization status of the data block to "up-to-date on CPU" at 510. Any subsequent device access to the data block will trigger synchronization at 512. Note that this mechanism defers the data transfer.

If the argument is write-only, then device memory 112 is allocated at 514 but no data transfer is initially made (in fact, the data block is supposed to be written by the function call that executes on device memory). All OS page table entries corresponding to the given address range are marked as invalid at 516. In this case, any subsequent CPU access to the data block will trigger a segmentation fault. Faults caused by read operations will be resolved into device-to-host memory transfers at 518 unless the data block is already in synchronized status. Faults caused by write operations will be resolved by setting the data block synchronization status to "up-to-date on CPU" at 520.

If the argument is read-write, then device memory 112 is allocated at 522 and data are initially synchronized at 523 by performing a host-to-device memory transfer. In addition, all OS page table entries corresponding to the given address range are marked as invalid at 524. Page fault handling happens as in the write-only case, with read accesses triggering synchronization at 526 and block 528 setting the "up-to-date" synchronization status upon write access.

If the function call is scheduled on an integrated device, then the system tries to allocate page-locked memory. If this operation is not successful, then the data block handling described in the distributed case will be performed. Otherwise, data will be copied to the newly allocated region, which is shared between CPU 102 and device 110. To ensure coherence, any subsequent CPU access to the linear addresses in the data block, should be redirected to the shared area. This is accomplished by marking all OS page table entries corresponding to the linear address ranges in the block as invalid. The page fault handler will resolve the fault by redirecting the access to the shared area. After the initial copy, no additional data transfer is required.

Figure 6:
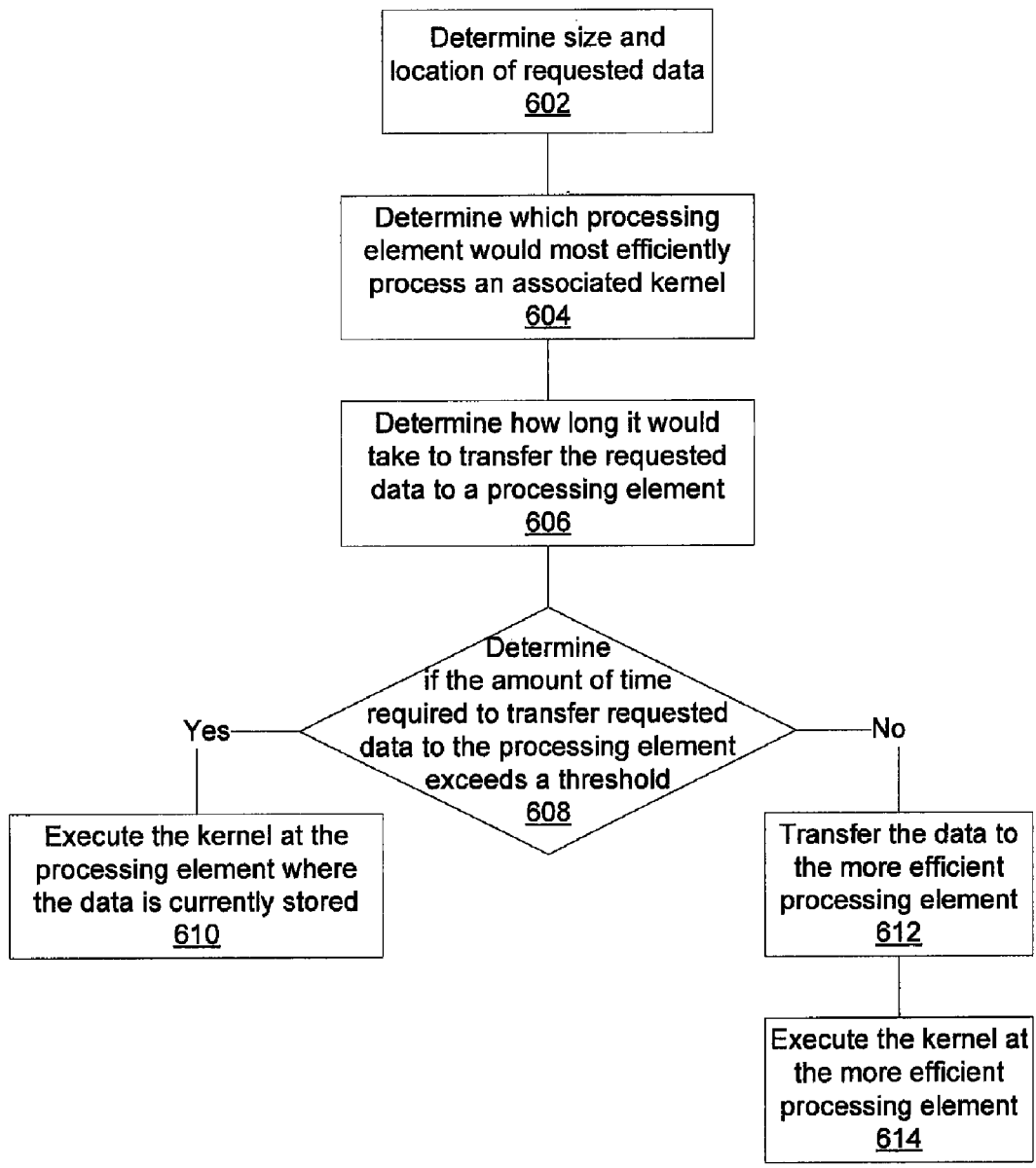
FIG. 6 shows a block/flow diagram of a system/method for managing data transfers.

Referring now to FIG. 6, an overview of the above-described processing methodologies is shown. At block 602, the size and location of data used by a kernel is determined. Block 604 determines whether the CPU or one of the accelerators would most efficiently execute the kernel. If the data is already located at the fastest processor for executing the kernel, the remaining steps may be skipped and the kernel may be executed at that processor. Block 606 determines how long it would take to transfer the requested data from its current location to another processing element. For example, if the data is stored in the CPU's memory, determining how long it would take to transfer that data to the accelerator memory. Block 608 then determines whether the transfer time required is too great (e.g., if it exceeds a specified threshold). If so, the kernel is assigned to whichever processing element currently stores the requested data at block 601. If not, block 610 transfers the data to the more efficient processing element and the kernel is assigned there at block 612.

Using the above-described data-aware systems and methods, legacy applications may be used on heterogeneous platforms in a transparent manner, requiring no input or interaction on the part of the programmer.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for data-aware scheduling of applications on a discrete heterogeneous platform having at least one central processing unit (CPU) and at least one accelerator having at least one graphics processing unit (GPU), comprising:
- a function call handling module configured to intercept, analyze, and schedule library calls on a processing element, comprising:
  - a function call interception module configured to intercept function calls to predefined library kernels having one or more CPU library implementation and one or more accelerators library implementation;
  - a function call analysis module configured to analyze argument size and location of requested data used by a predefined library kernel; and
  - a function call redirection module configured to schedule library calls and data transfers; and
  - a memory unification module, configured to keep data coherent between different memories associated with the at least one CPU and the at least one accelerator based on the output of the function call redirection module by synchronizing CPU memory and accelerator memory; and
  - in response to the analyzed argument size and the location of requested data, the function call analysis module configured to determine whether the CPU or one of the accelerators would most efficiently execute the predefined library kernel, and if the data is not located at a fastest processor for executing the predefined library kernel;
  - the function call analysis module configured to compare a time needed to transfer data having the analyzed argument size to a threshold;
  - if the time needed to transfer data having the analyzed argument size is greater than the threshold, scheduling the predefined library kernel at a first processing element currently storing the requested data;
  - if the time needed to transfer data is below the threshold, transferring the requested data to a more efficient processing element and assigning the predefined library kernel at the more efficient processing element at a second location.

2. The system of claim 1, wherein the function call analysis module is configured to analyze a size of the parameters and a location of the corresponding data and is further configured to use profiling information to estimate the execution time of the function call on the at least one CPU and the at least one accelerator.

3. The system of claim 1, wherein the function call redirection module is configured to redirect function calls to the most suitable library implementation based on the output of the function call analysis module.

4. The system of claim 1, wherein the memory unification module is configured to synchronize CPU and accelerator memory and to maintain coherence by triggering data transfers between CPU memory and accelerator memory.

5. The system of claim 4, wherein the memory unification module is configured to operate transparently, such that programs using the system interact with a single virtual shared memory system for the at least one CPU and the at least one accelerator.

6. The system of claim 1, wherein the memory unification module maintains a mapping between the content of CPU and accelerator memories and provides an interface to the function call handling module.

7. The system of claim 6, wherein the memory unification module provides an interface that is configured to trigger CPU-to-accelerator and accelerator-CPU data transfers.

8. The system of claim 1, wherein the memory unification module is configured to maintain a synchronization status for all CPU data blocks that have been mapped to an accelerator.

9. The system of claim 8, wherein the memory unification module is configured to update the synchronization status of the data blocks in response to data access operations.

10. The system of claim 8, wherein the memory unification module is configured to maintain a list of memory locations that are mapped to the accelerators and integrate with an operating system by via a page fault handler of the operating system, such that page faults are invoked when the CPU accesses memory locations that are mapped to an accelerator and page faults are serviced by the transfer of data between the CPU and said accelerator.

11. A method for data-aware scheduling of applications on a discrete heterogeneous platform having at least one central processing unit (CPU) and at least one accelerator having at least one graphics processing unit (GPU), comprising:
- intercepting, determining, and scheduling library calls on a processing element, comprising;
  - intercepting function calls to predefined library kernels having one or more CPU library implementation and one or more accelerators library implementation;
  - determining argument size and location of requested data used by a predefined library kernel; and
  - scheduling library calls and data transfers; and
  - keeping data coherent between different memories associated with the at least one CPU and the at least one accelerator based on the output of scheduling library calls and data transfers by synchronizing CPU memory and accelerator memory; and
  - in response to the determined argument size and the location of requested data, determining whether the CPU or one of the accelerators would most efficiently execute the predefined library kernel, and if the data is not located at a fastest processor for executing the predefined library kernel;
  - comparing a time needed to transfer data having the determined argument size to a threshold;
  - if the time needed to transfer data having the determined argument size is greater than the threshold, scheduling the predefined library kernel at a first processing element currently storing the requested data;
  - if the time needed to transfer data is below the threshold, transferring the requested data to a more efficient processing element and assigning the predefined library kernel at the more efficient processing element at second location.

12. The method of claim 11, wherein the comparison of the data transfer time to the threshold is further based on an estimated time of execution of the function call on the first and the second processing element.

* * * * *